(12) United States Patent
Tang (10) Patent No.: US 12,292,641 B2
(45) Date of Patent: May 6, 2025

(54) DISPLAY PANEL AND DISPLAY TERMINAL (71) Applicant: TCL CHINA STAR OPTOELECTRONICS TECHNOLOGY CO., LTD., Shenzhen (CN)

(72) Inventor: Hanting Tang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/600,455

(22) PCT Filed: Sep. 7, 2021

(86) PCT No.: PCT/CN2021/116931
§ 371 (c)(1),
(2) Date: May 22, 2024

(87) PCT Pub. No.: WO2023/000457
PCT Pub. Date: Jan. 26, 2023

(65) Prior Publication Data
US 2024/0302690 A1   Sep. 12, 2024

(30) Foreign Application Priority Data
Jul. 20, 2021   (CN) .......................... 202110817001.5

(51) Int. Cl.
*G02F 1/1335* (2006.01)
*G02F 1/1339* (2006.01)
*G02F 1/1343* (2006.01)

(52) U.S. Cl.
CPC .... *G02F 1/133514* (2013.01); *G02F 1/13392* (2013.01); *G02F 1/134309* (2013.01)

(58) Field of Classification Search
CPC ........... G02F 2001/1502; G02F 1/1347; G02F 1/13471; G02F 1/13473; G02F 1/15; G02F 1/13394
See application file for complete search history.

(56) References Cited

U.S. PATENT DOCUMENTS 5,161,048 A  * 11/1992 Rukavina ................. C09K 9/00
                                                                359/266
6,573,969 B1 *  6/2003 Watanabe ........... G02F 1/13394
                                                                349/110

(Continued)

FOREIGN PATENT DOCUMENTS

CN   101706635 A    5/2010
CN   102759824 A   10/2012
(Continued)

*Primary Examiner* — Jessica M Merlin
(74) *Attorney, Agent, or Firm* — PV IP PC; Wei Te Chung; Christopher S Ruprecht (57) ABSTRACT

A display panel and a display terminal are provided. The display panel includes a first base plate and a second base plate disposed facing each other, and a liquid crystal layer disposed between the first base plate and the second base plate. The first base plate includes a color-changing matrix, and the color-changing matrix includes an electrochromic material. The second base plate includes a guide hole, and an orthographic projection of the guide hole on the first base plate is located in the color-changing matrix.

18 Claims, 3 Drawing Sheets

(56) References Cited

U.S. PATENT DOCUMENTS

| | | | |
|---|---|---|---|
| 2008/0002110 A1* | 1/2008 | Choi | G02F 1/133514 |
| | | | 349/106 |
| 2011/0228376 A1* | 9/2011 | Chung | G02F 1/161 |
| | | | 438/34 |
| 2014/0375937 A1 | 12/2014 | Lee et al. | |
| 2016/0299395 A1 | 10/2016 | Kosuge et al. | |
| 2018/0052364 A1* | 2/2018 | Park | G02F 1/134309 |

FOREIGN PATENT DOCUMENTS

| | | |
|---|---|---|
| CN | 103760730 A | 4/2014 |
| CN | 104977762 A | 10/2015 |
| CN | 107092113 A | 8/2017 |
| CN | 207488677 U | 6/2018 |
| CN | 109407390 A | 3/2019 |
| CN | 109709706 A | 5/2019 |
| CN | 111061092 A | 4/2020 |
| CN | 111240117 A | 6/2020 |
| CN | 111650790 A | 9/2020 |
| CN | 112558361 A | 3/2021 |
| JP | 2007163646 A | 6/2007 |
| TW | 201122684 A | 7/2011 |
| TW | 201430465 A | 8/2014 |
| WO | 2019064575 A1 | 4/2019 |

\* cited by examiner

DISPLAY PANEL AND DISPLAY TERMINAL

CROSS REFERENCE TO RELATED APPLICATIONS

This application is a National Phase of PCT Patent Application No. PCT/CN2021/116931 having International filing date of Sep. 7, 2021, which claims the benefit of priority of Chinese Application No. 202110817001.5 filed on Jul. 20, 2021. The contents of the above applications are all incorporated by reference as if fully set forth herein in their entirety.

TECHNICAL FIELD

This application relates to the field of display technologies, and specifically, to a display panel and a display terminal.

RELATED ART

In the field of liquid crystal display (LCD) manufacturing, the technique of color filter on array (COA) is an integration technique integrating a color filter together with an array base plate, that is, coating the array base plate with a color resist to form a color filter layer.

However, since the array base plate is coated with the color resist, thickness of the array base plate increases. An alignment film polymer controlling an arrangement direction of liquid crystals on the array base plate gets difficult to flow into a deepened guide hole. As a result, alignment of liquid crystals in a guide hole region is abnormal, and an aperture with different brightness from brightness of a nearby region is formed in the guide hole region during display, resulting in a technical problem of uneven brightness display of a display device.

SUMMARY

Technical Problems

Existing display devices have a technical problem of uneven brightness display due to abnormal alignment of liquid crystals in a guide hole region.

Solutions to Problems

Technical Solutions

This application provides a display panel and a display terminal, to resolve the technical problem of uneven brightness display of a display device caused because an aperture with different brightness from brightness of a nearby region is formed in the guide hole region on a display panel during display.

In order to resolve the foregoing technical problem, this application provides the following technical solutions:

This application provides a display panel, comprising a first base plate and a second base plate disposed facing each other, and a liquid crystal layer disposed between the first base plate and the second base plate, where
  the first base plate comprises a color-changing matrix, and the color-changing matrix comprises an electrochromic material; and
  the second base plate comprises a guide hole, and an orthographic projection of the guide hole on the first base plate is located in an orthographic projection of the color-changing matrix on the first base plate.

In the display panel of this application, the first base plate comprises a first electrode layer and a second electrode layer, the color-changing matrix is disposed on the first electrode layer, and the second electrode layer is disposed on the color-changing matrix.

In the display panel of this application, an electric field configured to drive the color-changing matrix to change a color is disposed between the first electrode layer and the second electrode layer.

In the display panel of this application, the first electrode layer comprises at least a plurality of first electrode strips and a plurality of second electrode strips, the plurality of first electrode strips are arranged along a first direction, the plurality of second electrode strips are arranged along a second direction, and the first direction is perpendicular to the second direction.

In the display panel of this application, orthographic projections of the first electrode strips and the second electrode strips on the first base plate are located in the orthographic projection of the color-changing matrix on the first base plate.

In the display panel of this application, the first electrode layer covers a surface of the first base plate, and the color-changing matrix is disposed on a surface of the first electrode layer away from the first base plate.

In the display panel of this application, a region between the first electrode layer and the second electrode layer other than the color-changing matrix is filled with an electrode insulation layer.

In the display panel of this application, the second electrode layer is disposed on surfaces of the color-changing matrix and the electrode insulation layer away from the first electrode layer.

In the display panel of this application, a difference between voltages of the first electrode layer and the second electrode layer for driving the color-changing matrix to change a color ranges from 2 volts to 5 volts.

In the display panel of this application, the second base plate comprises an array driving layer, a color resist layer disposed on the array driving layer, and a pixel electrode layer disposed on the color resist layer.

In the display panel of this application, the guide hole penetrates through the color resist layer and an insulation layer on a thin film transistor in the array driving layer.

In the display panel of this application, the pixel electrode layer is electrically connected to the thin film transistor in the array driving layer by the guide hole.

In the display panel of this application, a columnar spacer is disposed between the first base plate and the second base plate, and an electrical connection component is disposed on the columnar spacer.

In the display panel of this application, the first electrode layer is electrically connected to a first input end, the second electrode layer is electrically connected to a second input end, and the first input end and the array driving layer on the second base plate are arranged in a same layer.

In the display panel of this application, a first end of the columnar spacer is connected to the first electrode layer, a second end of the columnar spacer is connected to the first input end, and the first electrode layer is electrically connected to the first input end by the electrical connection component on the columnar spacer.

In the display panel of this application, the array driving layer comprises an active layer, a gate layer, and a source/ drain layer, and a transmission line connected to the electrical connection component is disposed in the array driving layer.

In the display panel of this application, the transmission line is arranged in a same layer with at least one of the active layer, the gate layer, or the source/drain layer.

In the display panel of this application, the electrical connection component comprises a connecting wire disposed in the columnar spacer.

In the display panel of this application, the connecting wire penetrates through the columnar spacer, a first end of the connecting wire is connected to the first electrode layer, and a second end of the connecting wire is connected to the transmission line.

This application further provides a display terminal, comprising a terminal body and the foregoing display panel.

Beneficial Effects of the Invention

Beneficial Effects

In this application, a color-changing matrix including an electrochromic material is disposed on a first base plate, and a first electrode layer and a second electrode layer are disposed on two sides of the color-changing matrix respectively. By controlling values of voltages on the first electrode layer and the second electrode layer, the color-changing matrix is kept transparent during alignment and becomes black during development. In this way, polymerizable active liquid crystal monomers in a liquid crystal layer can polymerize under an ultraviolet (UV) light condition during the alignment, and ion precipitation due to incomplete coverage of an alignment film at a guide hole during the development is suppressed. Therefore, a voltage difference between the guide hole and a nearby region is decreased, and apertures and twill lines at the guide hole are reduced, thereby improving brightness evenness of a display panel at the guide hole.

BRIEF DESCRIPTION OF THE DRAWINGS

Description of the Drawings

To describe technical solutions in embodiments of this application more clearly, the following briefly introduces the accompanying drawings required for describing the embodiments. Apparently, the accompanying drawings in the following descriptions show only some embodiments of this application, and a person skilled in the art may still derive other accompanying drawings from these accompanying drawings without creative efforts.

DETAILED DESCRIPTION

Implementations of the Invention

Technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide a display panel and a display terminal. Detailed descriptions are separately provided below. It should be noted that a description sequence of the following embodiments is not intended to limit preference orders of the embodiments.

Currently, to resolve a problem of a low aperture ratio of a color filter and difficult alignment of upper and lower base plates in an LCD, the technique of COA is usually adopted to dispose a color resist originally disposed on a color filter base plate on an array base plate. However, since the array base plate is coated with the color resist, thickness of the array base plate increases. Correspondingly, depth of a guide hole located on the array base plate and used for conducting each electrode layer increases. Due to the large depth and small hole diameter of the guide hole, an alignment film polymer controlling an arrangement direction of liquid crystals on the array base plate gets difficult to flow into the guide hole. As a result, alignment of liquid crystals in a guide hole region is abnormal. An aperture with different brightness from brightness of a nearby region is formed in the guide hole region during display of a display panel, thereby causing a technical problem of uneven brightness display of a display device. Based on the foregoing technical problem, this application provides the following technical solutions.

Referring to FIG. 1 to FIG. 4, this application provides a display panel, including a first base plate 100 and a second base plate 200 disposed facing each other, and a liquid crystal layer 300 disposed between the first base plate 100 and the second base plate 200. The first base plate 100 includes a color-changing matrix 110, and the color-changing matrix 110 includes an electrochromic material. The second base plate 200 includes a guide hole 210, and an orthographic projection of the guide hole 210 on the first base plate 100 is located in an orthographic projection of the color-changing matrix 110 on the first base plate 100.

In this application, by disposing the color-changing matrix 110 including the electrochromic material on the first base plate 100, the color-changing matrix 110 is kept transparent during alignment. In this way, polymerizable active liquid crystal monomers in the liquid crystal layer 300 can polymerize under an ultraviolet (UV) light condition, and ion precipitation due to incomplete coverage of an alignment film at the guide hole 210 during development is suppressed. Therefore, a voltage difference between the guide hole 210 and a nearby region is decreased, and apertures and twill lines at the guide hole 210 are reduced, thereby improving brightness display evenness of a display device.

The technical solutions of this application are described now with reference to specific embodiments.

In this embodiment, referring to FIG. 1 to FIG. 4, the second base plate 200 further includes a second substrate 220, an array driving layer 230 located on the second substrate 220, and a pixel electrode layer 260 disposed on the array driving layer 230.

In this embodiment, the second substrate 220 may be made of glass, quartz, polyimide, or other materials. The array driving layer 230 is a thin film transistor layer, and the thin film transistor layer may include a plurality of thin film transistors. The thin film transistor layer may be of etching stop type, back channel etching type, bottom-gate thin film transistor type, top-gate thin film transistor type, or other structures. This application does not make specific limitations. For example, the thin film transistor layer of bottom-gate thin film transistor type may include a gate layer 231 located on the second substrate 220, a gate insulation layer 232 located on the gate layer 231, an active layer 233 located on the gate insulation layer 232, a source/drain layer 234 located on the active layer 233, and a passivation layer 235 located on the source/drain layer 234.

In this embodiment, a color resist layer 240 is further disposed on the passivation layer 235. The color resist layer 240 may be a trichromatic color filter including red (R), green (G), and blue (B) or a tetrachromatic color filter including red (R), green (G), blue (B), and white (W).

In this embodiment, a planarization layer 250 is further disposed on the color resist layer 240. The planarization layer 250 may include perfluoroalkoxy alkane (PFA) or silicon on glass (SOG). The pixel electrode layer 260 is disposed on a side of the planarization layer 250 away from the color resist layer 240. The pixel electrode layer 260 is a transparent conductive film layer, such as an indium tin oxide (ITO) or zinc oxide (ZnO)-based transparent conductive oxide (TCO) film, a multi-component TCO film, or a high-mobility TCO film. A second alignment film layer 270 is disposed on the pixel electrode layer 260. The second alignment film layer 270 is a polymer capable of controlling an arrangement direction of liquid crystals, such as polyimide.

In this embodiment, the guide hole 210 penetrates through the color resist layer 240 and the passivation layer 235 from the planarization layer 250, and extends to connect to the source/drain layer 234 of the thin film transistor. In this application, by disposing the color resist layer 240 on the passivation layer 235, the color resist layer 240 is located on the second base plate 200, thereby resolving the problem of a low aperture ratio and difficult alignment of upper and lower base plates when the color filter is located on the first base plate 100.

In the display panel of this application, referring to FIG. 1 to FIG. 4, the first base plate 100 may include a first substrate 120, a first electrode layer 130 located on the first substrate 120, the color-changing matrix 110 disposed on the first electrode layer 130, a second electrode layer 140 located on the color-changing matrix 110, and a first alignment film layer 150 disposed on the second electrode layer 140. The orthographic projection, of the guide hole 210 on the second base plate 200, on the first base plate 100 is located in the orthographic projection of the color-changing matrix 110 on the first base plate 100.

In this embodiment, the first electrode layer 130 may be a transparent conductive film layer coating the first substrate 120, such as an ITO or ZnO-based TCO film, a multi-component TCO film, or a high-mobility TCO film.

The color-changing matrix 110 is disposed on a side surface of the first electrode layer 130 away from the first substrate 120. The color-changing matrix 110 includes an electrochromic material. The electrochromic material may be a VI B group metal oxide material, such as $WO_3$.

The second electrode layer 140 is a transparent conductive film layer coating an entire side surface of the color-changing matrix 110 away from the first electrode layer 130, such as an ITO or ZnO-based TCO film, a multi-component TCO film, or a high-mobility TCO film.

An electric field is formed between the first electrode layer 130 and the second electrode layer 140 to drive the color-changing matrix 110 to change a color.

In this application, using photoelectric characteristics of the electrochromic material, the electrochromic material is made into the color-changing matrix 110. In addition, the electric field is formed by the first electrode layer 130 and the second electrode layer 140 on two sides of the color-changing matrix 110. In this way, the color-changing matrix 110 is kept transparent during alignment and becomes black by the effect of the electric field during development of the display panel. During the alignment, UV light can go through the transparent color-changing matrix 110 to polymerize the polymerizable active liquid crystal monomers in the liquid crystal layer 300, and to suppress the ion precipitation due to incomplete coverage of the alignment film at the guide hole 210 during development. Therefore, a voltage difference between the guide hole 210 and a nearby region is decreased, and apertures and twill lines at the guide hole 210 are reduced.

Figure 1:
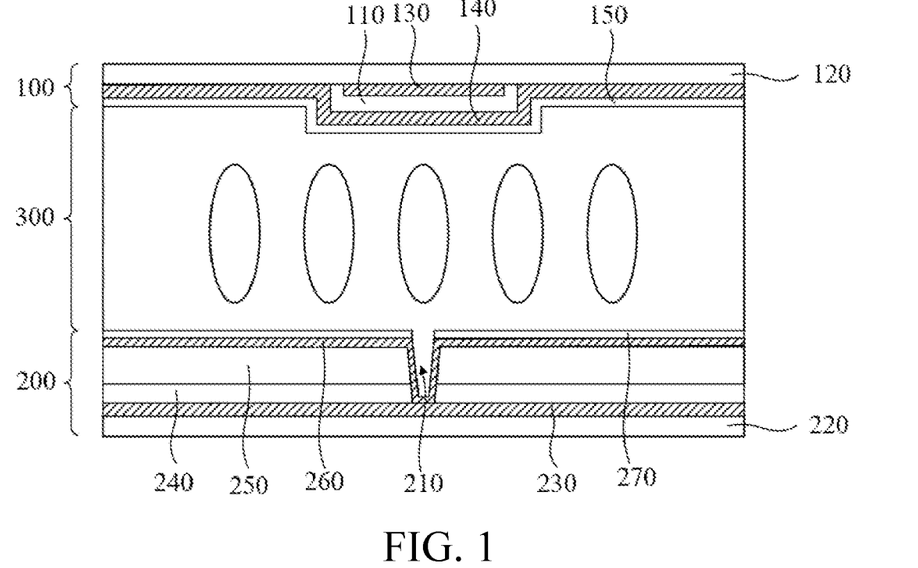
FIG. 1 is a schematic diagram of a first structure of a display panel according to this application.

In the display panel of this application, referring to FIG. 1, the color-changing matrix 110 completely wraps the first electrode layer 130. Insulation between the second electrode layer 140 and the first electrode layer 130 is implemented by using the color-changing matrix 110. The color-changing matrix 110 completely wraps the first electrode layer 130, to implement the insulation between the first electrode layer 130 and the second electrode layer 140; and avoid introducing a new insulation layer, thereby decreasing thickness of the first base plate 100.

Figure 3:
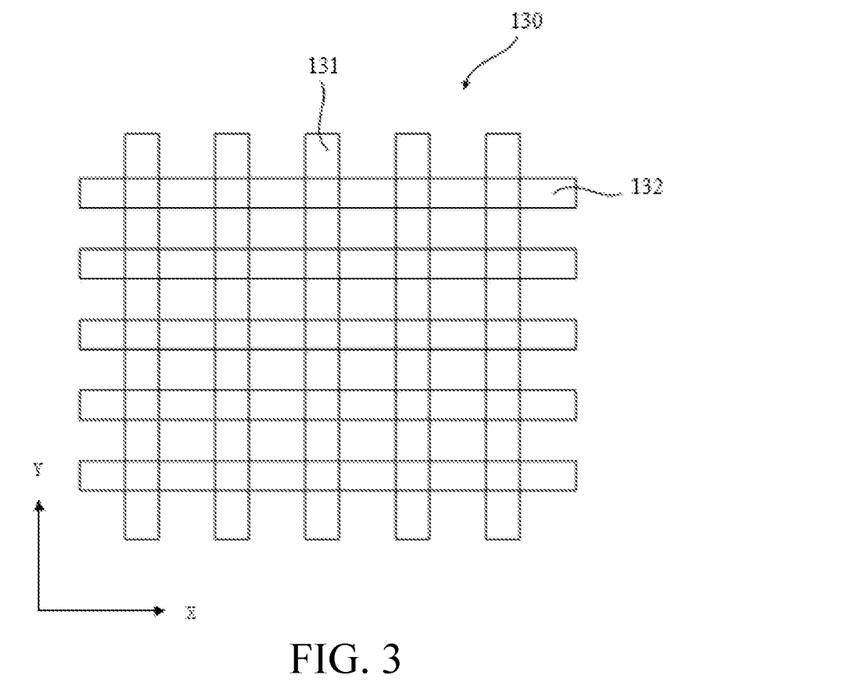
FIG. 3 is a schematic planar structural diagram of a first electrode layer according to this application.

In the display panel of this application, referring to FIG. 3, the first electrode layer 130 may include at least a plurality of first electrode strips 131 and a plurality of second electrode strips 132. The plurality of first electrode strips 131 is arranged along a first direction X in a parallel manner. The plurality of second electrode strips 132 is arranged along a second direction Y in a parallel manner. The first direction X is perpendicular to the second direction Y. That is, the plurality of first electrode strips 131 and the plurality of second electrode strips 132 of the first electrode layer 130 are disposed in a crisscross manner on the first substrate 120. Orthographic projections of the first electrode strips 131 and the second electrode strips 132 on the first base plate 100 are located in the orthographic projection of the color-changing matrix 110 on the first base plate 100.

The first electrode layer 130 is disposed in a crisscross manner on the first substrate 120, so that the first electrode layer 130 corresponds to the color-changing matrix 110 in position. In addition, the orthographic projection of the first electrode layer 130 on the first base plate 100 is located in the color-changing matrix 110. In this way, the color-changing matrix 110 is exactly located in the electric field formed between the first electrode layer 130 and the second electrode layer 140. As a result, the electric field has a more effective and stable effect on the color-changing matrix 110, and the color-changing matrix 110 takes less time to change a color.

Figure 4:
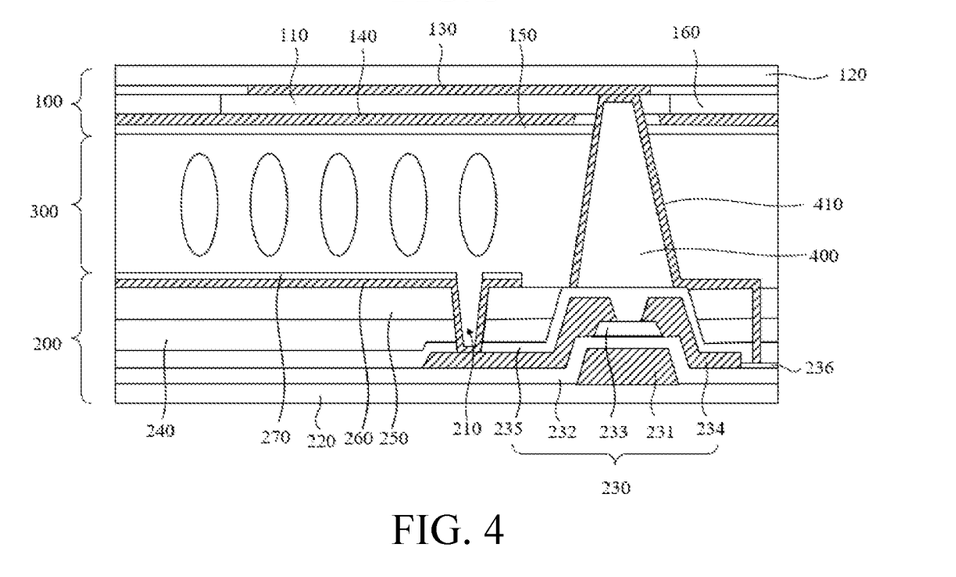
FIG. 4 is a schematic diagram of a third structure of a display panel according to this application.

In the display panel of this application, referring to FIG. 4, the first electrode layer 130 covers a surface of the first substrate 120. The color-changing matrix 110 is disposed on a surface of the first electrode layer 130 away from the first substrate 120. A region between the first electrode layer 130 and the second electrode layer 140 other than the color-changing matrix 110 is filled with an electrode insulation layer 160. The second electrode layer 140 is disposed on surfaces of the color-changing matrix 110 and the electrode insulation layer 160 away from the first electrode layer 130. In this embodiment, by filling the region between the first electrode layer 130 and the second electrode layer 140 other than the color-changing matrix 110 with the electrode insulation layer 160, a gap between the first electrode layer 130 and the second electrode layer 140 may be eliminated. In this way, layer structure compactness of the first base plate 100 is enhanced, thereby improving internal structural strength.

In the display panel of this application, the first electrode layer 130 is electrically connected to a first input end. The first input end is configured to input a varying voltage to the first electrode layer 130. The second electrode layer 140 is electrically connected to a second input end. The second input end is configured to input a constant voltage to the second electrode layer 140.

During the alignment, a difference between the voltages of the first electrode layer 130 and the second electrode layer 140 is made to be zero, thereby causing the color-changing matrix 110 to keep transparent. During development of the display panel, the first input end inputs the varying voltage signal to the first electrode layer 130, and the second input end inputs the constant voltage to the second electrode layer 140. In this way, there is a voltage difference between the first electrode layer 130 and the second electrode layer 140. The color-changing matrix 110 becomes black by the effect of the electric field, providing a good shading and anti-color-mixing effect.

In the display panel of this application, the first input end and the second input end may both be disposed on the first base plate 100 and arranged in a same layer with the array driving layer 230. Electric signal access ports or power ports (not shown in the figure) respectively corresponding to the first input end and the second input end may be disposed on the first base plate 100. The first input end and the second input end are both disposed on the first base plate 100, so that the voltage signals of the first input end and the second input end are transmitted from a side of the first base plate 100. Circuits on the first base plate 100 and the second base plate 200 are produced mutually independently, and a manufacture process is simpler.

In the display panel of this application, the first input end may be disposed on the second base plate 200, and the second input end may be disposed on the first base plate 100. The first input end and the second input end are respectively disposed on the second base plate 200 and the first base plate 100, so that the first input end and the second input end are independent of each other. The circuits are not prone to interfere with each other, and there is no need to introduce a new power layer. Thickness of the base plate can be decreased, and wiring is facilitated.

In the display panel of this application, the difference between the voltages of the first electrode layer 130 and the second electrode layer 140 for driving the color-changing matrix 110 to change a color ranges from 2 volts to 5 volts. By the effect of the electric field ranging from 2 volts to 5 volts, the color-changing matrix 110 made of the electrochromic material can quickly switch to a black and non-transparent state before the development starts, thereby providing a better shading and anti-color-mixing effect.

In the display panel of this application, referring to FIG. 2 to FIG. 5, a columnar spacer 400 is further disposed between the first base plate 100 and the second base plate 200, and an electrical connection component 410 is disposed on the columnar spacer 400. A first end of the columnar spacer 400 is connected to the first electrode layer 130. A second end of the columnar spacer 400 extends into the array driving layer 230 and is connected to the first input end. In this embodiment, the first input end is arranged in the same layer with the array driving layer 230. In addition, the first electrode layer 130 is connected to the first input end by the columnar spacer 400, so that a voltage input end of the first electrode layer 130 is located on the array driving layer 230. In this way, introducing another power layer structure is avoided, thereby decreasing thickness of the display panel. In addition, the columnar spacer 400 provides a good supporting effect for the first base plate 100 and the second base plate 200, making the display panel have a more stable structure.

Figure 2:
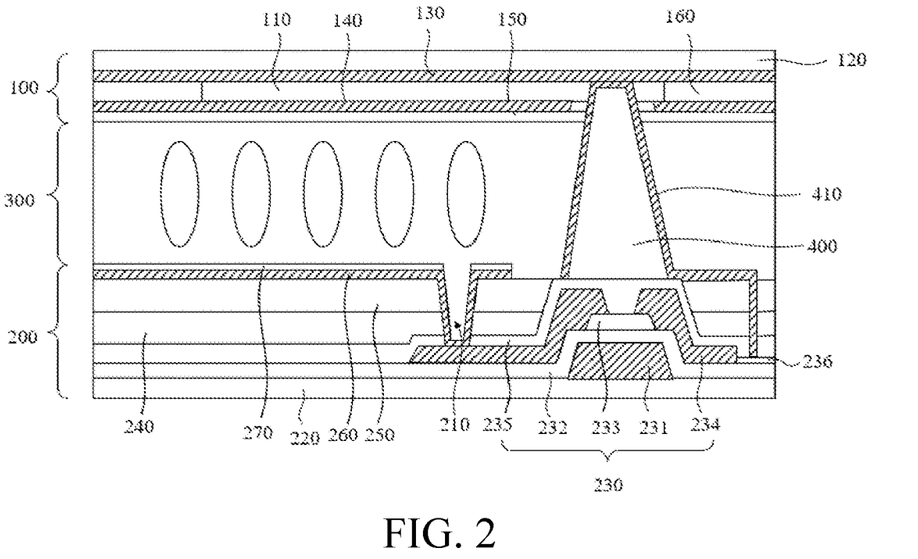
FIG. 2 is a schematic diagram of a second structure of a display panel according to this application.

In the display panel of this application, referring to FIG. 2 and FIG. 4, the electrical connection component 410 may be a conductive film layer coating a surface of the columnar spacer 400, such as an ITO or ZnO-based TCO film, a multi-component TCO film, or a high-mobility TCO film. In this embodiment, the electrical connection component 410 at the first end of the columnar spacer 400 is connected to the first electrode layer 130. The electrical connection component 410 at the second end of the columnar spacer 400 extends along the surface of the columnar spacer 400 into the array driving layer 230 and is connected to the first input end.

It should be noted that, there is a gap between the electrical connection component 410 on the surface of the columnar spacer 400 and the second electrode layer 140 to implement insulation. In this way, the voltage difference between the first electrode layer 130 and the second electrode layer 140 can be maintained. In this embodiment, the electrical connection component 410 in a shape of conductive film layer may directly coat the surface of the columnar spacer 400. A manufacture process is simple.

In the display panel of this application, a transmission line 236 configured to transmit the voltage signals is disposed in the array driving layer 230. The transmission line 236 is arranged in a same layer with at least one of the active layer 233, the gate layer 231, and the source/drain layer 234 in the array driving layer 230. For example, as shown in FIG. 2 to FIG. 4, the transmission line 236 is arranged in a same layer with the source/drain layer 234. A first end of the transmission line 236 is used as the first input end, and is electrically connected to the electrical connection component 410 on the surface of the columnar spacer 400. A second end of the transmission line 236 extends to an edge position of the array driving layer 230, and can be connected to an external power supply (not shown in the figures).

The guide hole 210 is formed on the planarization layer 250. In addition, a through hole is formed on the planarization layer 250 on a side of the columnar spacer 400. The through hole extends into the source/drain layer 234, and is connected to the transmission line 236, so that the conductive film layer (namely, the electrical connection component 410) subsequently coating the columnar spacer 400 can flow into the through hole, thereby electrically connecting to the transmission line 236.

In this embodiment, the transmission line 236 is arranged in the same layer with the active layer 233, the gate layer 231, or the source/drain layer 234, so that there is no need to additionally dispose a new layer structure for the transmission line 236 used as the first input end. Therefore, introducing a new power electrode layer is avoided, the thickness of the display panel is decreased, and an internal circuit structure is simplified.

Figure 5:
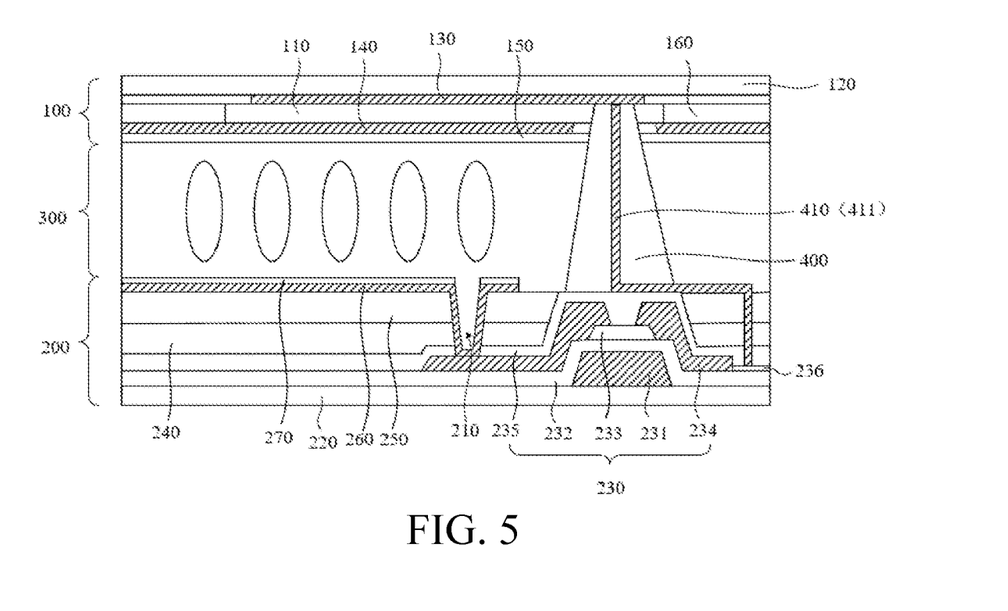
FIG. 5 is a schematic diagram of a fourth structure of a display panel according to this application.

In the display panel of this application, referring to FIG. 5, the electrical connection component 410 may further include a connecting wire 411 disposed inside the columnar spacer 400.

The connecting wire 411 penetrates through the columnar spacer 400, a first end of the connecting wire 411 is connected to the first electrode layer 130, and a second end of the connecting wire 411 is connected to the transmission line 236. By effects of the columnar spacer 400 and the connecting wire 411 disposed inside the columnar spacer 400, the voltage signals in the transmission line 236 can be transmitted to the first electrode layer 130, implementing control over the voltage of the first electrode layer 130. The connecting wire 411 inside the columnar spacer 400, being protected by the columnar spacer 400, is not prone to stretch or deform, thereby providing a more stable electric connection effect.

In this embodiment, the color-changing matrix 110 including the electrochromic material is disposed on the first base plate 100. In addition, the first electrode layer 130 and the second electrode layer 140 are disposed on the first base plate 100. By the effect of the electric field between the first electrode layer 130 and the second electrode layer 140, the color-changing matrix 110 is kept transparent during the alignment and becomes black during the development. Therefore, the polymerizable active liquid crystal monomers in the liquid crystal layer 300 polymerize under the UV light condition, and the ion precipitation due to incomplete coverage of the alignment film at the guide hole 210 during the development is suppressed. Therefore, the voltage difference between the guide hole 210 and the nearby region is decreased, and the apertures and twill lines at the guide hole 210 are reduced, thereby improving the brightness display evenness of the display device.

This application further provides a display terminal, including a terminal body and the display panel according to the foregoing embodiments.

A display panel and a display terminal provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not construed as a limit on this application.

What is claimed is:

1. A display panel, comprising a first base plate and a second base plate disposed facing each other, and a liquid crystal layer disposed between the first base plate and the second base plate, wherein
   the first base plate comprises a color-changing matrix, and the color-changing matrix comprises an electrochromic material;
   the second base plate comprises a guide hole and an array driving layer, and an orthographic projection of the guide hole on the first base plate is located in an orthographic projection of the color-changing matrix on the first base plate,
   the first base plate comprises a first electrode layer and a second electrode layer, the color-changing matrix is disposed on the first electrode layer, and the second electrode layer is disposed on the color-changing matrix, and
   the first electrode layer is electrically connected to a first input end, the second electrode layer is electrically connected to a second input end, and the first input end and the array driving layer on the second base plate are arranged in a same layer.

2. The display panel according to claim 1, wherein an electric field configured to drive the color-changing matrix to change a color is disposed between the first electrode layer and the second electrode layer.

3. The display panel according to claim 2, wherein the first electrode layer comprises at least a plurality of first electrode strips and a plurality of second electrode strips, the plurality of first electrode strips are arranged along a first direction, the plurality of second electrode strips are arranged along a second direction, and the first direction is perpendicular to the second direction.

4. The display panel according to claim 3, wherein orthographic projections of the first electrode strips and the second electrode strips on the first base plate are located in the orthographic projection of the color-changing matrix on the first base plate.

5. The display panel according to claim 4, wherein the first electrode layer covers a surface of the first base plate, and the color-changing matrix is disposed on a surface of the first electrode layer away from the first base plate.

6. The display panel according to claim 5, wherein a region between the first electrode layer and the second electrode layer other than the color-changing matrix is filled with an electrode insulation layer.

7. The display panel according to claim 6, wherein the second electrode layer is disposed on surfaces of the color-changing matrix and the electrode insulation layer away from the first electrode layer.

8. The display panel according to claim 3, wherein a difference between voltages of the first electrode layer and the second electrode layer for driving the color-changing matrix to change a color ranges from 2 volts to 5 volts.

9. The display panel according to claim 8, wherein the second base plate comprises a color resist layer disposed on the array driving layer, and a pixel electrode layer disposed on the color resist layer.

10. The display panel according to claim 9, wherein the guide hole penetrates through the color resist layer and an insulation layer on a thin film transistor in the array driving layer.

11. The display panel according to claim 10, wherein the pixel electrode layer is electrically connected to the thin film transistor in the array driving layer by the guide hole.

12. The display panel according to claim 9, wherein a columnar spacer is disposed between the first base plate and the second base plate, and an electrical connection component is disposed on the columnar spacer.

13. The display panel according to claim 12, wherein a first end of the columnar spacer is connected to the first electrode layer, a second end of the columnar spacer is connected to the first input end, and the first electrode layer is electrically connected to the first input end by the electrical connection component on the columnar spacer.

14. The display panel according to claim 12, wherein the array driving layer comprises an active layer, a gate layer, and a source/drain layer, and a transmission line connected to the electrical connection component is disposed in the array driving layer.

15. The display panel according to claim 14, wherein the transmission line is arranged in a same layer with at least one of the active layer, the gate layer, or the source/drain layer.

16. The display panel according to claim 15, wherein the electrical connection component comprises a connecting wire disposed in the columnar spacer.

17. The display panel according to claim 16, wherein the connecting wire penetrates through the columnar spacer, a first end of the connecting wire is connected to the first electrode layer, and a second end of the connecting wire is connected to the transmission line.

18. A display terminal, comprising a terminal body and the display panel according to claim 1.

* * * * *